US012687136B2

(12) United States Patent
Jamison et al.

(10) Patent No.: US 12,687,136 B2
(45) Date of Patent: Jul. 21, 2026

(54) SYSTEMS AND METHODS FOR COOLING AN INNER WALL OF A THRUST REVERSER OF AN ENGINE OF AN AIRCRAFT

(71) Applicant: THE BOEING COMPANY, Arlington, VA (US)

(72) Inventors: Brandon Parker Jamison, Mount Pleasant, SC (US); Andrew Casimir Kulak, Everett, WA (US)

(73) Assignee: The Boeing Company, Arlington, VA (US)

( * ) Notice: Subject to any disclaimer, the term of this patent is extended or adjusted under 35 U.S.C. 154(b) by 111 days.

(21) Appl. No.: 18/634,044

(22) Filed: Apr. 12, 2024

(65) Prior Publication Data

US 2025/0320845 A1 Oct. 16, 2025

(51) Int. Cl.
*F02K 1/82* (2006.01)
*F02K 1/64* (2006.01)
F02K 1/54 (2006.01)

(52) U.S. Cl.
CPC ................ *F02K 1/822* (2013.01); *F02K 1/64* (2013.01); *F02K 1/827* (2013.01); *F02K 1/54* (2013.01); *F05D 2240/15* (2013.01); *F05D 2250/11* (2013.01); *F05D 2260/96* (2013.01); *F05D 2300/121* (2013.01)

(58) Field of Classification Search
CPC ... F02K 1/822; F02K 1/54; F02K 1/64; F02K 1/827
See application file for complete search history.

(56) References Cited

U.S. PATENT DOCUMENTS

| | | | | | |
|---|---|---|---|---|---|
| 4,443,059 | A | * | 4/1984 | Wells | F28F 3/12 |
| | | | | | 359/845 |
| 5,083,426 | A | * | 1/1992 | Layland | F02K 1/78 |
| | | | | | 428/116 |
| 5,596,870 | A | * | 1/1997 | Dillard | F02K 1/822 |
| | | | | | 60/782 |
| 6,122,892 | A | * | 9/2000 | Gonidec | B32B 3/12 |
| | | | | | 428/116 |
| 9,683,444 | B1 | * | 6/2017 | Jones | F01D 5/188 |

(Continued)

FOREIGN PATENT DOCUMENTS

EP 1783350 10/2011

OTHER PUBLICATIONS

Extended European Search Report for EP 25167254.9-1009, dated Jul. 28, 2025.

*Primary Examiner* — Ted Kim
(74) *Attorney, Agent, or Firm* — Joseph M. Butscher; Carroll, Hoette & Butscher, LLC

(57) ABSTRACT

An engine of an aircraft includes a thrust reverser having an inner wall, which is formed by a panel assembly including an isogrid panel. An inner heat shield is coupled to a first side of the isogrid panel. An air plenum is disposed between the isogrid panel and the inner heat shield. An outer skin is coupled to a second side of the isogrid panel. The second side is opposite from the first side. One or more air inlet vent holes are formed through the isogrid panel and the outer skin. The one or more air inlet vent holes fluidly couple to the air plenum. One or more air outlet vent holes are formed through the isogrid panel and the outer skin. The one or more air outlet vent holes fluidly couple to the air plenum.

20 Claims, 7 Drawing Sheets

(56)     References Cited

U.S. PATENT DOCUMENTS

| | | | | |
|---|---|---|---|---|
| 9,771,868 B2 * | 9/2017 | Nesbitt | .................. | F01D 25/24 |
| 10,947,904 B2 * | 3/2021 | Olson | ................... | B64D 29/06 |
| 2014/0133964 A1 | 5/2014 | Ayle | | |
| 2020/0291645 A1 * | 9/2020 | Scamardo | .............. | B32B 5/028 |

\* cited by examiner

150

160

SYSTEMS AND METHODS FOR COOLING AN INNER WALL OF A THRUST REVERSER OF AN ENGINE OF AN AIRCRAFT

FIELD OF THE DISCLOSURE

Examples of the present disclosure generally relate to systems and methods for cooling an inner wall of a thrust reverser of an engine of an aircraft.

BACKGROUND OF THE DISCLOSURE

Certain aircraft include engines having a thrust reverser, which operates to divert thrust to decelerate the aircraft, such as during a landing procedure. A thermal protection system is used to insulate the thrust reverser from the engine core. A known thermal protection system includes a carbon epoxy panel coupled to an inner wall of the thrust reverser. However, lapses in coverage may allow heat to reach the carbon epoxy inner wall, which may not be rated for certain excessive temperatures.

SUMMARY OF THE DISCLOSURE

A need exists for a system and a method for cooling a thrust reverser of an engine of an aircraft. With that need in mind, certain examples of the present disclosure provide a panel assembly including an isogrid panel. An inner heat shield is coupled to a first side of the isogrid panel. An air plenum is disposed between the isogrid panel and the inner heat shield. An outer skin is coupled to a second side of the isogrid panel. The second side is opposite from the first side. One or more air inlet vent holes are formed through the isogrid panel and the outer skin. The one or more air inlet vent holes fluidly couple to the air plenum. One or more air outlet vent holes are formed through the isogrid panel and the outer skin. The one or more air outlet vent holes fluidly couple to the air plenum.

In at least one example, the panel assembly forms an inner wall of a thrust reverser of an engine of an aircraft. As a further example, the outer skin faces a fan duct, and the inner heat shield faces an engine core compartment.

In at least one example, the isogrid panel includes a base plate, and ribs extending from the base plate. Triangular recesses are formed between the base plate and the ribs.

The isogrid panel can be formed from aluminum.

In at least one example, the outer skin includes a plurality of perforations.

In at least one example, a plurality of standoff bars space the isogrid panel from the inner heat shield.

In at least one example, the one or more air inlet vent holes and the one or more air outlet vent holes do not extend into the inner heat shield.

In at least one example, the one or more air inlet vent holes are disposed at an inlet end of the panel assembly, and the one or more air outlet vent holes are disposed at an outlet end of the panel assembly.

Certain examples of the present disclosure provide a method for forming a panel assembly. The method includes coupling an inner heat shield to a first side of an isogrid panel, wherein an air plenum is disposed between the isogrid panel and the inner heat shield; coupling an outer skin coupled to a second side of the isogrid panel, wherein the second side is opposite from the first side; forming one or more air inlet vent holes through the isogrid panel and the outer skin; and forming one or more air outlet vent holes formed through the isogrid panel and the outer skin, wherein the one or more air outlet vent holes fluidly couple to the air plenum.

Certain examples of the present disclosure provide an engine for an aircraft. The engine includes a thrust reverser having an inner wall. The inner wall is formed by a panel assembly, as described herein.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide a system including a machined isogrid structural panel, a bonded perforated cold side skin, and a fastened hot side heat shield, which is passively cooled via air input from a cold side into a series of isolated channels between the isogrid panel and the heat shield. The system can provide a structural fairing panel, which may acoustically attenuate engine noise.

Figure 1:
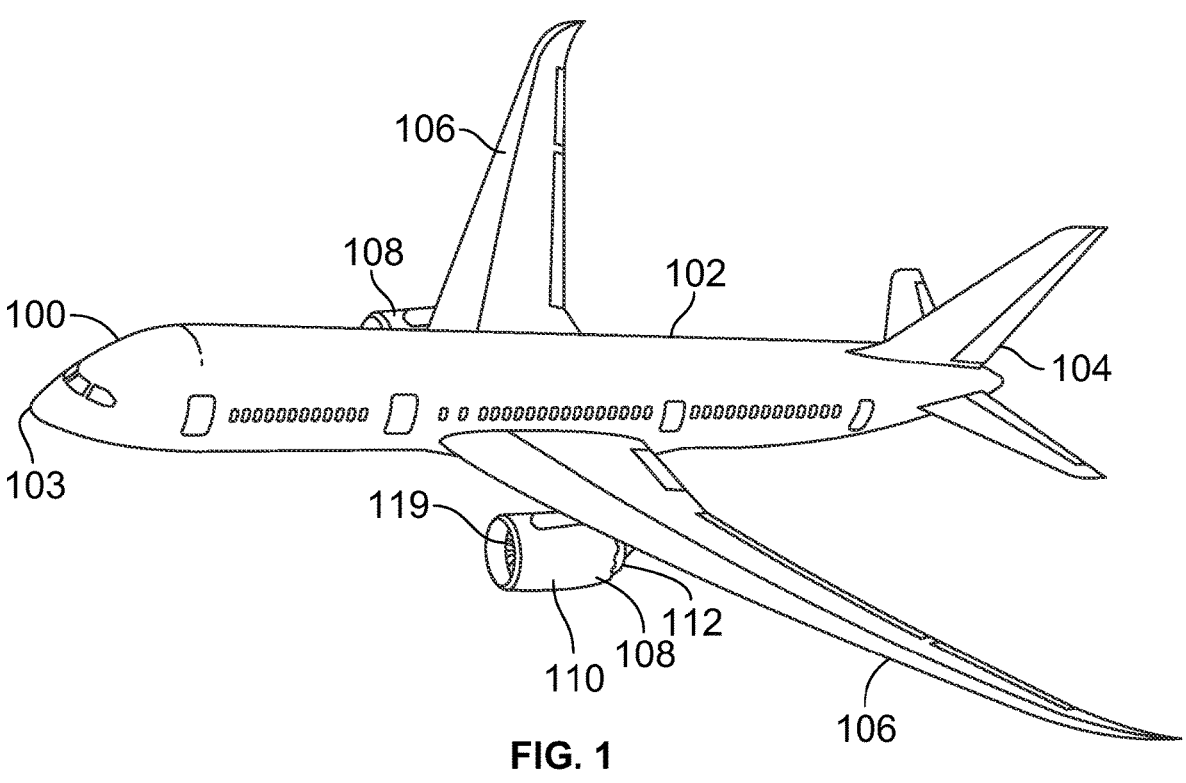
FIG. 1 illustrates a perspective view of an aircraft.

FIG. 1 illustrates a perspective view of an aircraft 100. The aircraft 100 includes a fuselage 102 extending from a nose 103 to an empennage 104. The empennage 104 may include one or more tail surfaces for directional control of the aircraft 100. The aircraft 100 includes a pair of wings 106 extending from the fuselage 102. One or more engines 108 propel the aircraft 100. The engines 108 are supported by the wings 106 of the aircraft 100, but may be mounted to the fuselage or tail in other types of aircraft. Each engine 108 can include a rotor assembly 119 with rotors that spin to direct air.

The rotor assembly 119 of each engine 108 is surrounded by a nacelle 110. The nacelle 110 is an outer casing or housing that holds the rotor assembly 119. The nacelle 110 includes an inlet section, referred to as an inlet cowl, at a leading or front end of the nacelle 110. In at least one example, the nacelle 110 also includes a fan cowl, a thrust reverser, and an aft fairing section located behind the inlet cowl along a longitudinal length of the nacelle 110. The inlet cowl has an inner barrel that defines an air inlet duct for directing air to the rotor assembly 119. The nacelle 110 may have an exhaust nozzle 112 (for example, a primary exhaust nozzle and a fan nozzle) at an aft end of the engine 108. In at least one example, each engine 108 is a gas turbine engine.

Figure 2:
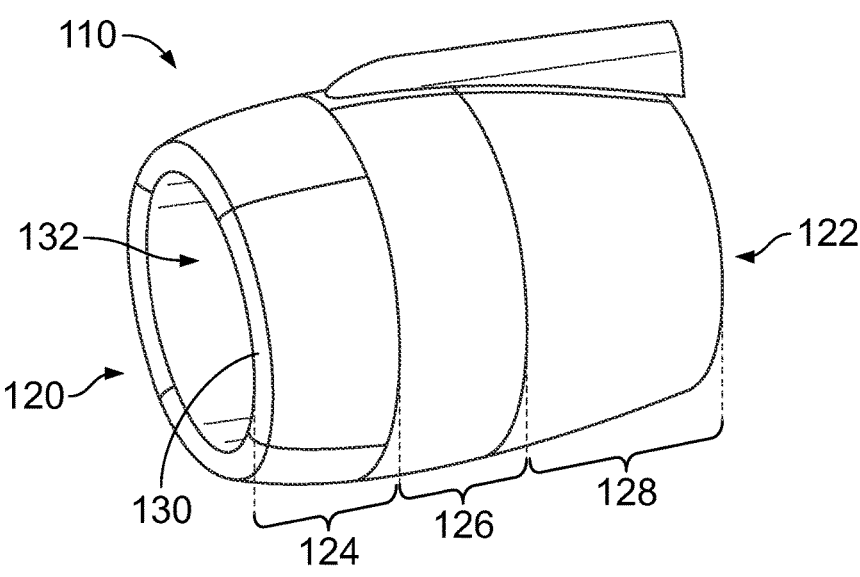
FIG. 2 illustrates a perspective view of a nacelle.

FIG. 2 illustrates a perspective view of a nacelle 110. The nacelle 110 extends a length from a front end 120 to an aft end 122 (opposite the front end 120). The nacelle 110 can include an inlet cowl 124, a fan cowl 126 disposed aft of the inlet cowl 124, and at least one aft section 128 disposed aft of the fan cowl 126. The inlet cowl 124 defines a leading edge 130 of the nacelle 110 at the front end 120 to direct air into a core 132 of the nacelle 110. The aft section 128 includes a thrust reverser.

Figure 3:
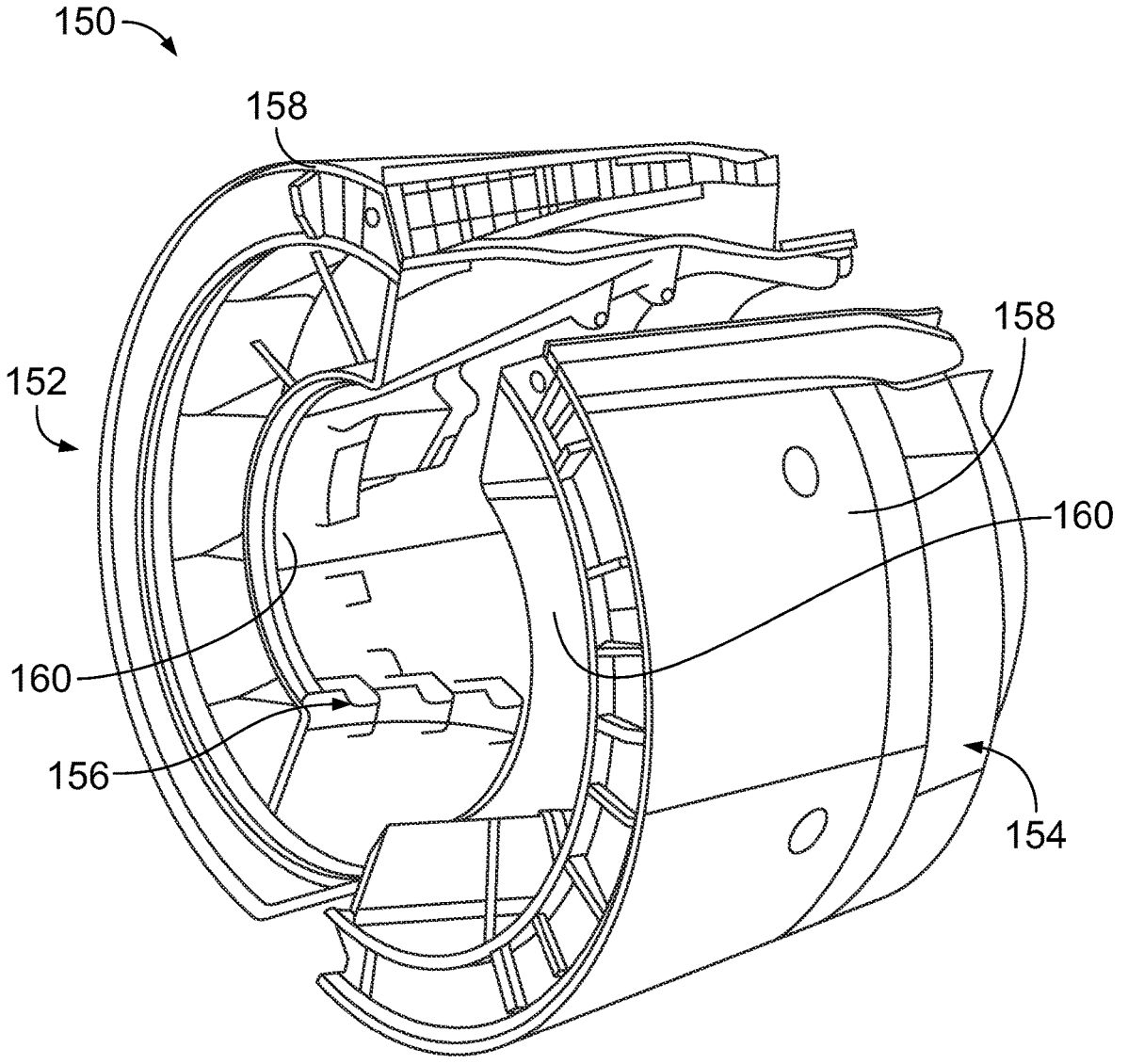
FIG. 3 illustrates a perspective view of a thrust reverser, according to an example of the present disclosure.

FIG. 3 illustrates a perspective view of a thrust reverser 150, according to an example of the present disclosure. The thrust reverser 150 is disposed within the aft section 128 of the nacelle 110 (shown in FIGS. 1 and 2). In at least one example, the thrust reverser 150 includes a first portion 152 spaced apart from a second portion 154. The first portion 152 and the second portion 154 can mirror one another. A passage 156 extends between the first portion 152 and the second portion 154. At least a portion of an engine core extends into the passage 156.

Each of the first portion 152 and the second portion 154 includes a main exterior body 158, and an inner wall 160 coupled to the main exterior body 158. The inner wall 160 faces the passage 156.

Figure 4:
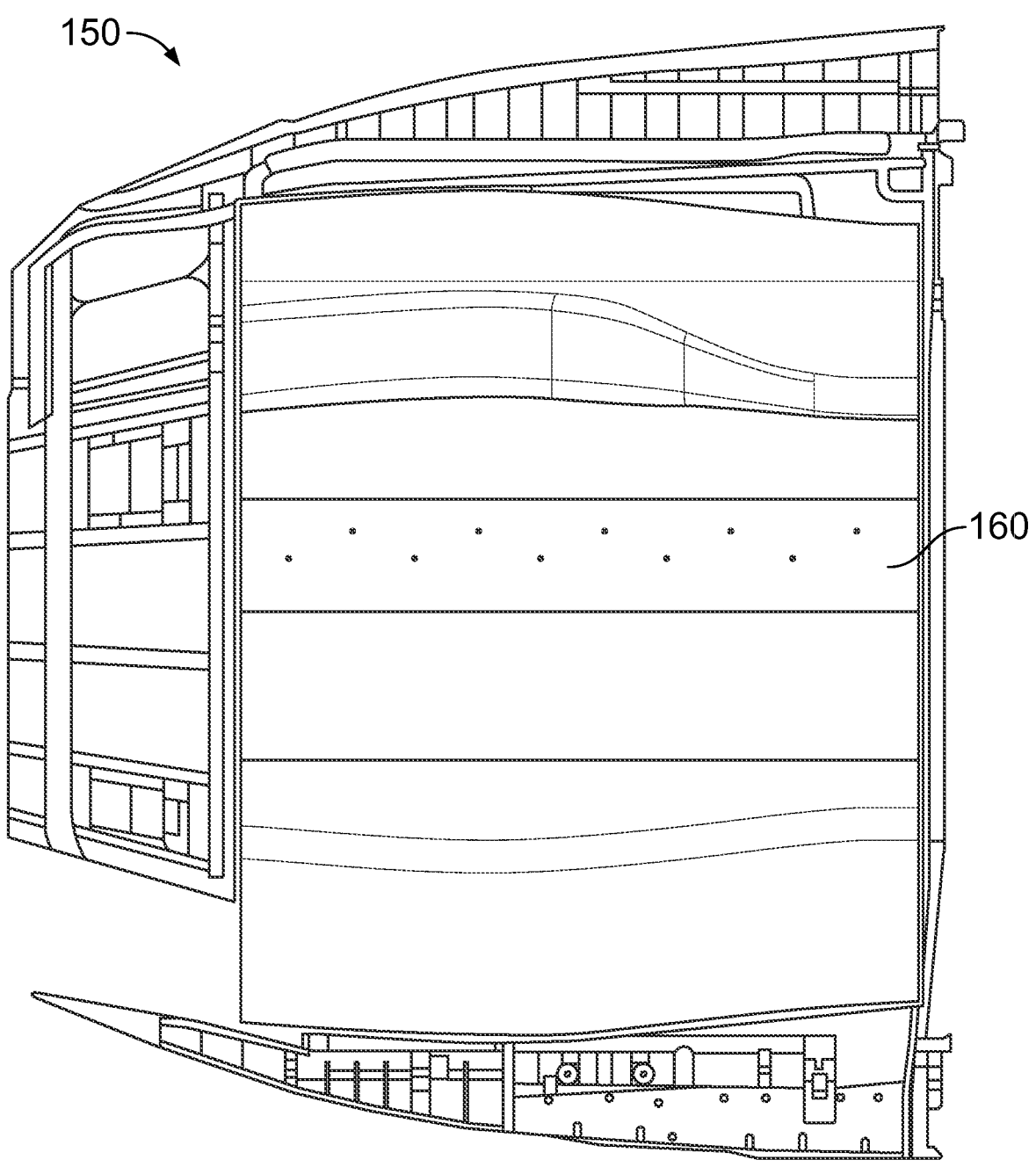
FIG. 4 illustrates a lateral view of an inner wall of a thrust reverser, according to an example of the present disclosure.

FIG. 4 illustrates a lateral view of an inner wall 160 of a thrust reverser 150, according to an example of the present disclosure. As described herein, the inner wall 160 provides a system for cooling the thrust reverser 150.

Figure 5:
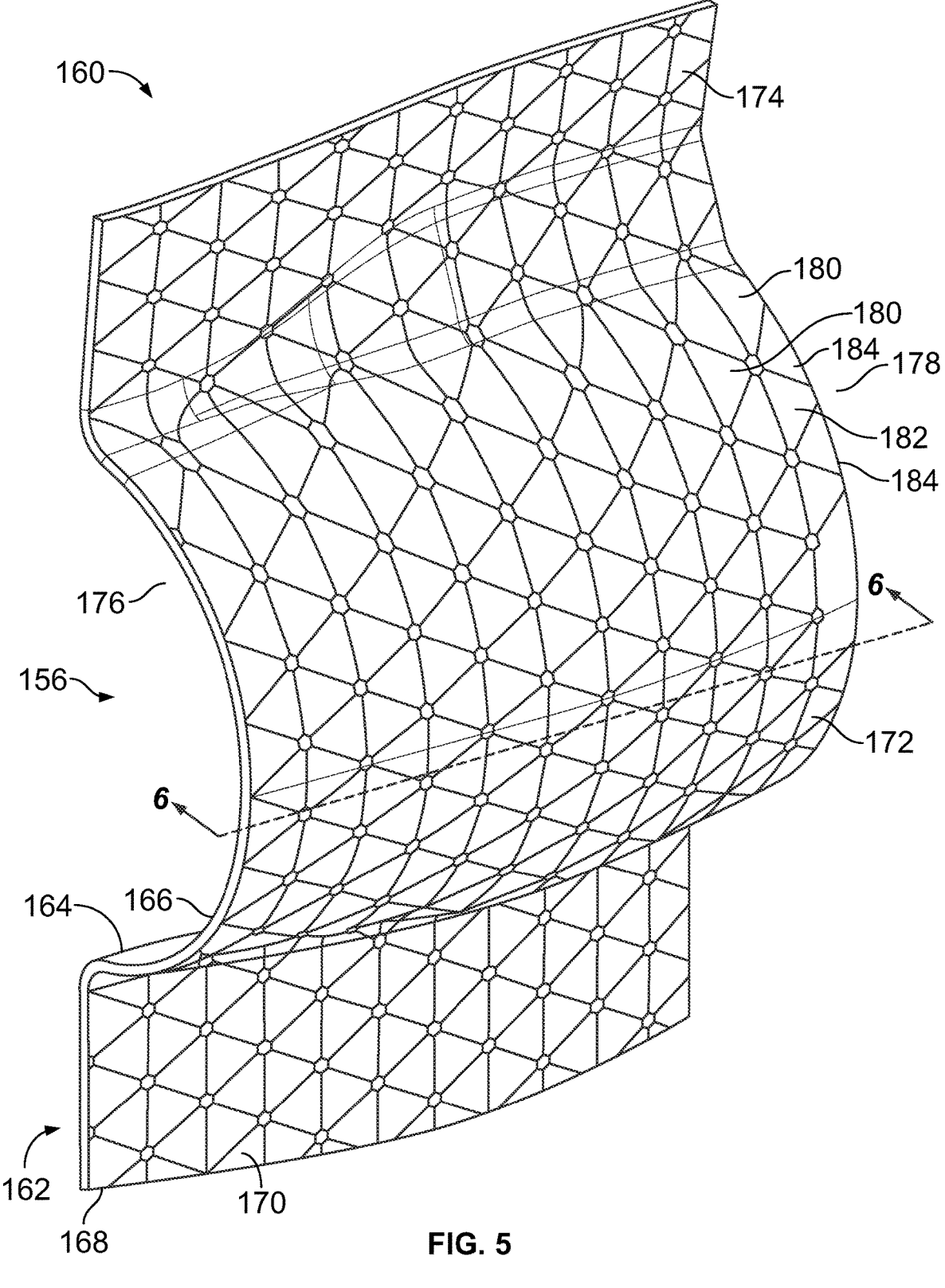
FIG. 5 illustrates a perspective lateral view of an inner wall, according to an example of the present disclosure.

FIG. 5 illustrates a perspective lateral view of the inner wall 160, according to an example of the present disclosure. The inner wall 160 includes a panel assembly 162 including an inner heat shield 164 coupled to an isogrid panel 166. An outer skin 168 is secured over the isogrid panel 166. For the sake of clarity, the outer skin 168 is shown transparent in FIG. 5. The outer skin 168 can be formed of a metal, such as aluminum.

The panel assembly 162 forms the inner wall 160. Optionally, the panel assembly 162 can be used to provide portions of various other structures, systems, devices, and the like.

In at least one example, the panel assembly 162 includes a lower flange 170 connected to an outwardly bowed barrel segment 172, which, in turn, connects to an upper flange 174. The panel assembly 162 includes an inlet end 176 and an outlet end 178.

The inner heat shield 164 faces the passage 156. That is, the inner heat shield 154 is configured to face an engine core compartment. In at least one example, the inner heat shield 164 is formed of a metal, such as corrosion-resistant steel (cres). As another example, the inner heat shield 164 is formed of titanium.

The isogrid panel 166 provides a stiffening structure having triangular recesses 180 formed between a base plate 182 and upstanding ribs 184. In at least one example, the isogrid panel 166 is formed of aluminum. For example, the isogrid panel 166 can be machined from aluminum. Optionally, the isogrid panel 166 can be formed of titanium, steel, or a nickel alloy. In at least one example, the isogrid panel 166 can be formed by three-dimensional printing.

Figures 6, 7:
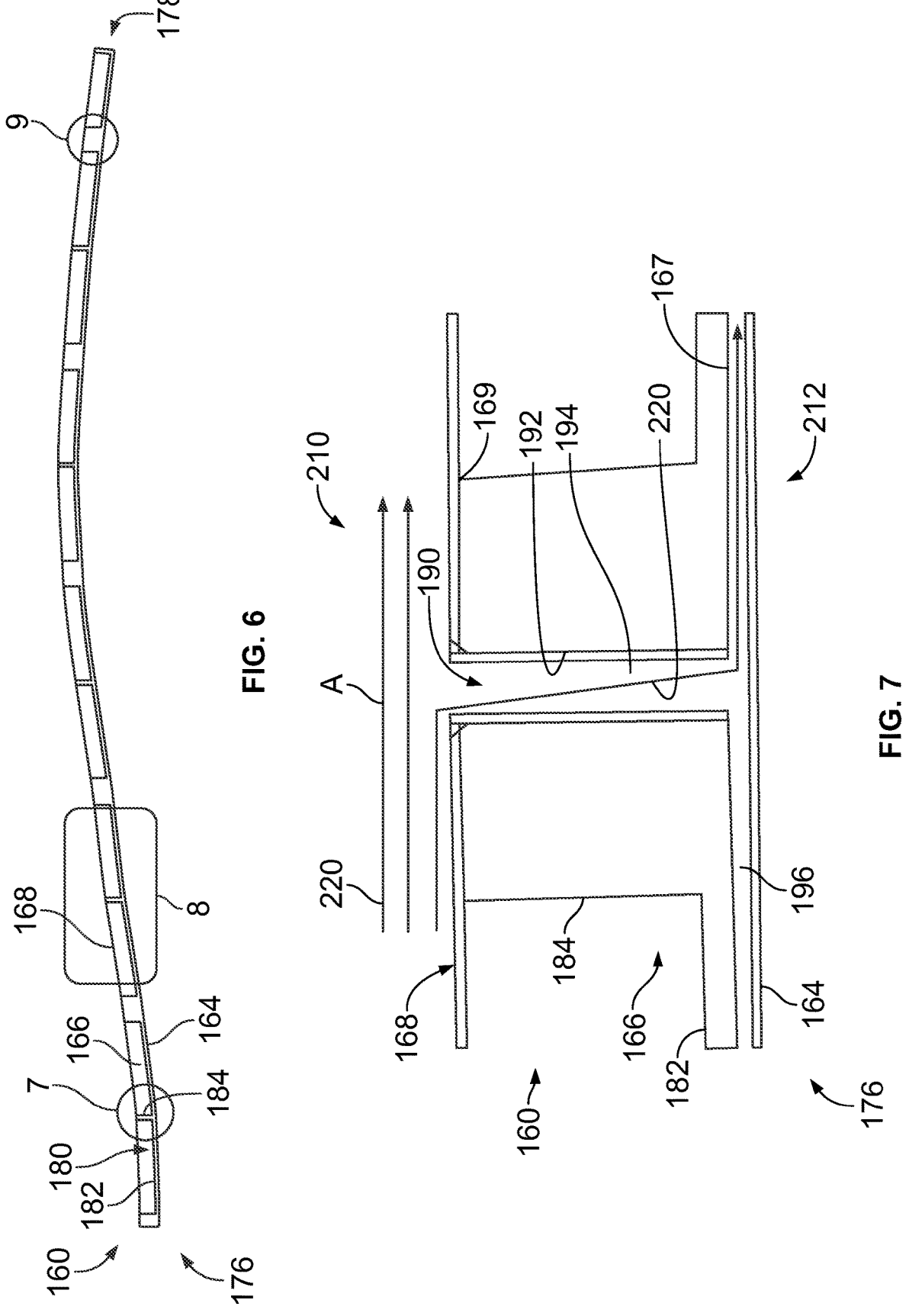
FIG. 6 illustrates a cross-sectional view of the inner wall through line 6-6 of FIG. 5.
FIG. 7 illustrates a cross-sectional view of the inner wall through portion 7 of FIG. 6.

FIG. 6 illustrates a cross-sectional view of the inner wall 160 through line 6-6 of FIG. 5. As shown, the recesses 180 are formed between the base plate 182 and the ribs 184. The outer skin 168 is secured to the ribs 184. For example, the outer skin 168 is bonded to the ribs 184. The outer skin 168 includes a plurality of perforations that allow sound energy to pass therethrough, and into the recesses 180. In this manner, the outer skin 168 provides a sound attenuation panel. The recesses 180 provide pockets that can attenuate acoustic energy when coupled with the outer skin 168.

The inner heat shield 164 is secured to the base plate 182 on an opposite side from the ribs 184. The inner heat shield 164 can be spaced from the base plate 182 by a plurality of standoff bars. In at least one example, the standoff bars are longitudinally continuous between the inner heat shield 164 and the base plate 182. The standoff bars maintain an even distribution between the inner heat shield 164 and the base plate 182.

FIG. 7 illustrates a cross-sectional view of the inner wall 160 through portion 7 of FIG. 6. Air inlet vent holes 190 are disposed within the inner wall 160 proximate to (such as at, or within 24 inches) of the inlet end 176. Referring to FIGS. 5-7, the air inlet vent holes 190 can be spaced apart from one another, and extend along an entire height of the inner wall 160. Each air inlet vent hole 190 is formed by a tube 192, which can be formed of a metal. For example, the tube 192 can be formed of cres. The tube 192 defines a central passage 194 that defines a fluid flow path. The air inlet vent hole 190 extends through the outer skin 168 and the isogrid panel 166. For example, the air inlet vent hole 190 can extend through a rib 184 and the plate 182 of the isogrid panel 166. The air inlet vent hole 190 does not extend through the inner heat shield 164.

As shown, an air plenum 196 extends between the isogrid panel 166 and the inner heat shield 164. Air flows into the air inlet vent holes 190 and into the air plenum 196. The air plenum 196 includes one or more isolated air channels between the isogrid panel 166 and the inner heat shield 164.

Figure 8:
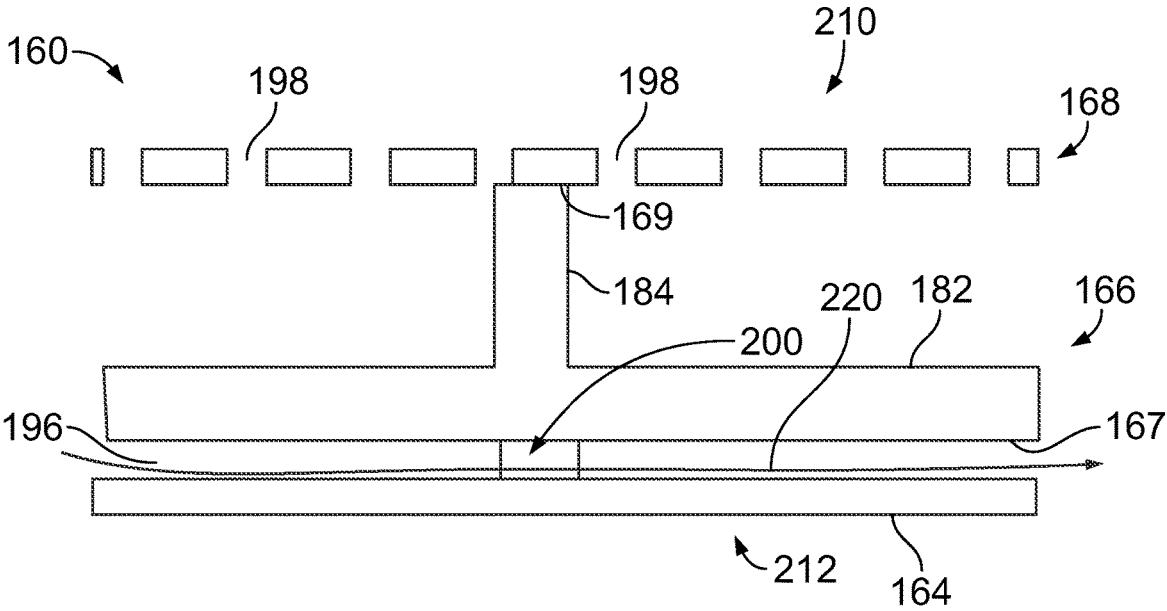
FIG. 8 illustrates a cross-sectional view of the inner wall through portion 8 of FIG. 6.

FIG. 8 illustrates a cross-sectional view of the inner wall 160 through portion 8 of FIG. 6. As shown, perforations 198 are formed through the outer skin 168. A plurality of standoff bars 200 secure the isogrid panel 166 to the inner heat shield 164. The standoff bars 200 can be formed of a low conductivity metal. For example, the standoff bars 200 can be formed from ceramic, ceramic felt, titanium, or steel. The standoff bars 200 space the isogrid panel 166 from the inner heat shield 164 to provide the air plenum 196 therebetween.

Figure 9:
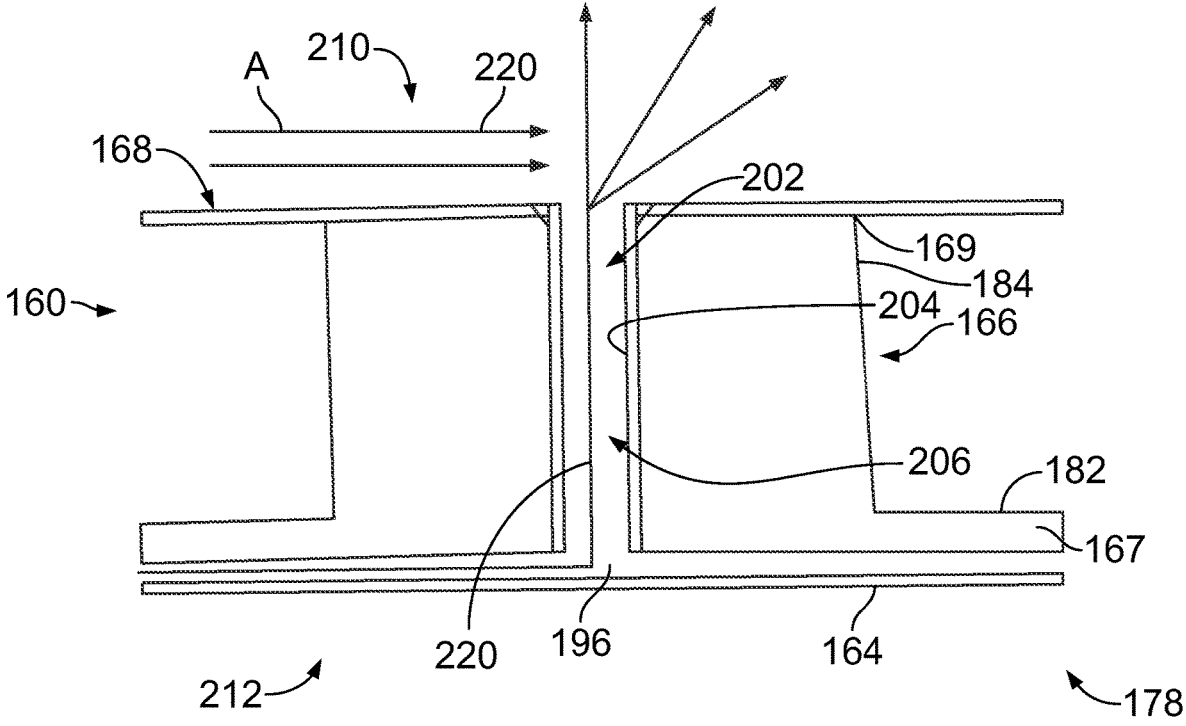
FIG. 9 illustrates a cross-sectional view of the inner wall through portion 9 of FIG. 6.

FIG. 9 illustrates a cross-sectional view of the inner wall 160 through portion 9 of FIG. 6. Air outlet vent holes 202 are disposed within the inner wall 160 proximate to (such as at, or within 24 inches) of the outlet end 178. Referring to FIGS. 5, 6, and 9, the air outlet vent holes 202 can be spaced apart from one another, and extend along an entire height of the inner wall 160. Each air outlet vent hole 202 is formed by a tube 204, which can be formed of a metal. For example, the tube 204 can be formed of cres. The tube 204 defines a central passage 206 that defines a fluid flow path. The air outlet vent hole 202 extends through the outer skin 168 and the isogrid panel 166. For example, the air outlet vent hole 202 can extend through a rib 184 and the plate 182 of the isogrid panel 166. The air outlet vent hole 202 does not extend through the inner heat shield 164.

Figure 10:
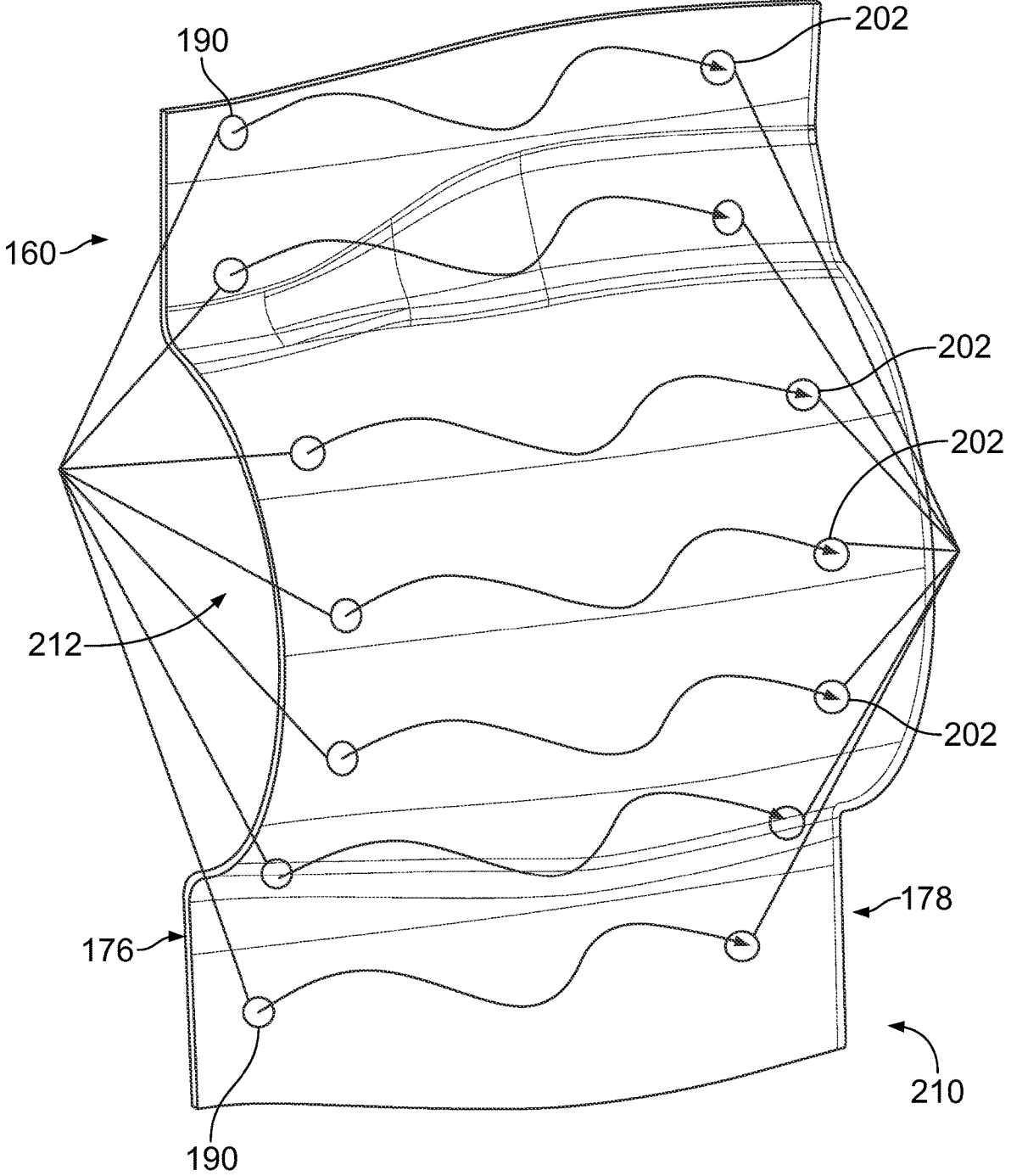
FIG. 10 illustrates a perspective lateral view of the inner wall, according to an example of the present disclosure.

FIG. 10 illustrates a perspective lateral view of the inner wall 160, according to an example of the present disclosure. Referring to FIGS. 1-10, the inner wall 160 includes a plurality of air inlet vent holes 190 proximate to the inlet end 176, and a plurality of air outlet vent holes 202 proximate to the outlet end 178. The inner wall 160 can include more or fewer air inlet vent holes 190 and air outlet vent holes 202 than shown. The outer skin 168 faces a fan duct 210, and the inner heat shield 164 faces an engine core compartment 212.

In operation, cool air 220 within the fan duct 210 travels in the direction of arrows A, from the inlet end 176 toward the outlet end 178. A portion of the cool air 220 passes into the air inlet vent holes 190, and passes into and through the air plenum 196 extending between the inner heat shield 164 and the isogrid panel 166. The portion of the cool air 220 then passes along the air plenum 196 and into the air outlet vent holes 202 at the outlet end 178. As such, the cooling air 220 passing into and through the air inlet vent holes 190, the air plenum 196, and out through the air outlet vent holes 202 provides efficient heat transfer to cool the inner wall 160. A fluid flow path is defined from the air inlet vent holes 190, the air plenum 196, and the air outlet vent holes 202, and provides even distribution through the inner wall 160.

As described herein, the inner wall 160 of the thrust reverser 150 is formed by the panel assembly 162, which includes the isogrid panel 166. The inner heat shield 164 is coupled to a first side 167 of the isogrid panel 166. The air plenum 196 is disposed between the isogrid panel 166 and the inner heat shield 164. The outer skin 168 is coupled to a second side 169 of the isogrid panel 166. The second side 169 is opposite from the first side 167. One or more air inlet vent holes 190 are formed through the isogrid panel 166 and the outer skin 168. The air inlet vent holes 190 fluidly couple to (for example, are in fluid communication with) the air plenum 196. One or more air outlet vent holes 202 are formed through the isogrid panel 166 and the outer skin 168. The air outlet vent holes 202 fluidly couple to the air plenum 196. As such, a fluid circuit or flow path is defined between the air inlet vent holes 190, the air plenum 196, and the air outlet vent holes 202.

The inner wall 160 is formed by the panel assembly 162, which provides a system for passive cooling. The panel assembly 162 provides improved thermal wicking to allow the heat to escape from the engine core compartment 212. The panel assembly 162 replaces a composite material system, allowing the heat from the engine core compartment 212 to escape into the fan duct 210, thereby reducing the temperature of the panel assembly 162. In addition to being cooled by fan air scrubbing flow, the inner wall 160 is passively cooled by engine fan air flowing through dedicated vents holes, which prevents the heat of the engine core compartment 212 from overwhelming the inner wall 160 and causing thermal degradation.

As compared to a composite material, the inner wall 160 provides improved thermal wicking properties, allowing the heat from the engine core compartment 212 to escape into the fan duct 210, reducing the panel temperature to acceptable levels. Passive cooling is provided by the vent holes 190 and 202 fluidly coupled to the air plenum 196. The inner heat shield 164 couples to the isogrid panel 166 via the standoff bars 200 to provide a radiation/conduction shield from the core heat. The isogrid panel 166 provides structural strength and integrity, while reducing overall weight (through the formed recesses 180). The outer skin 168 provides a flow-side aerodynamic fairing, and acoustic attenuation via the perforations 198.

The panel assembly 162 provides the inner wall 160 of the thrust reverser 150, which thereby allows for removal of insulating blankets. As such, maintenance burden is reduced as blankets can be susceptible to damage. Further, the panel assembly 162 is less costly to manufacture than a composite material and blanket.

As described herein, the system for cooling the thrust reverser 150 includes the inner wall 160, which directs the cool air 220 (for example, from the fan duct 210) into the air plenum 196 between the isogrid panel 166 and the inner heat shield 164. In at least one example, the inner wall 160 is formed of materials (such as aluminum and cres) that cost less, and are less expensive to process, than previously known systems, which use carbon epoxy prepreg, aluminum honeycomb core, and insulation blankets.

As described, the inner wall 160 provides a cooling system for a thrust reverser 150 of an engine of an aircraft. Optionally, the panel assembly 162 can provide a cooling system for various other structures, devices, systems, and the like.

Further, the disclosure comprises examples according to the following clauses:

Clause 1. A panel assembly comprising:

an isogrid panel;

an inner heat shield coupled to a first side of the isogrid panel, wherein an air plenum is disposed between the isogrid panel and the inner heat shield;

an outer skin coupled to a second side of the isogrid panel, wherein the second side is opposite from the first side;

one or more air inlet vent holes formed through the isogrid panel and the outer skin, wherein the one or more air inlet vent holes fluidly couple to the air plenum; and one or more air outlet vent holes formed through the isogrid panel and the outer skin, wherein the one or more air outlet vent holes fluidly couple to the air plenum.

Clause 2. The panel assembly of Clause 1, wherein the panel assembly forms an inner wall of a thrust reverser of an engine of an aircraft.

Clause 3. The panel assembly of Clause 2, wherein the outer skin faces a fan duct, and wherein the inner heat shield faces an engine core compartment.

Clause 4. The panel assembly of any of Clauses 1-3, wherein the isogrid panel comprises:

a base plate; and ribs extending from the base plate, wherein triangular recesses are formed between the base plate and the ribs.

Clause 5. The panel assembly of any of Clauses 1-4, wherein the isogrid panel is formed from aluminum.

Clause 6. The panel assembly of any of Clauses 1-5, wherein the outer skin comprises a plurality of perforations.

Clause 7. The panel assembly of any of Clauses 1-6, further comprising a plurality of standoff bars that space the isogrid panel from the inner heat shield.

Clause 8. The panel assembly of any of Clauses 1-7, wherein the one or more air inlet vent holes and the one or more air outlet vent holes do not extend into the inner heat shield.

Clause 9. The panel assembly of any of Clauses 1-8, wherein the one or more air inlet vent holes are disposed at an inlet end of the panel assembly, and wherein the one or more air outlet vent holes are disposed at an outlet end of the panel assembly.

Clause 10. A method for forming a panel assembly, the method comprising:

coupling an inner heat shield to a first side of an isogrid panel, wherein an air plenum is disposed between the isogrid panel and the inner heat shield;

coupling an outer skin coupled to a second side of the isogrid panel, wherein the second side is opposite from the first side;

forming one or more air inlet vent holes through the isogrid panel and the outer skin; and

7 forming one or more air outlet vent holes formed through the isogrid panel and the outer skin, wherein the one or more air outlet vent holes fluidly couple to the air plenum.

Clause 11. The method of Clause 10, further comprising forming, with the panel assembly, an inner wall of a thrust reverser of an engine of an aircraft.

Clause 12. The method of Clause 11, wherein the outer skin faces a fan duct, and wherein the inner heat shield faces an engine core compartment.

Clause 13. The method of any of Clauses 10-12, wherein the isogrid panel comprises:

a base plate; and ribs extending from the base plate, wherein triangular recesses are formed between the base plate and the ribs.

Clause 14. The method of any of Clauses 10-13, wherein the isogrid panel is formed from aluminum.

Clause 15. The method of any of Clauses 10-14, wherein the outer skin comprises a plurality of perforations.

Clause 16. The method of any of Clauses 10-15, further comprising spacing, by a plurality of standoff bars, the isogrid panel from the inner heat shield.

Clause 17. The method of any of Clauses 10-16, wherein the one or more air inlet vent holes and the one or more air outlet vent holes do not extend into the inner heat shield.

Clause 18. The method of any of Clauses 10-17, wherein the one or more air inlet vent holes are disposed at an inlet end of the panel assembly, and wherein the one or more air outlet vent holes are disposed at an outlet end of the panel assembly.

Clause 19. An engine for an aircraft, the engine comprising:

a thrust reverser having an inner wall, wherein the inner wall is formed by a panel assembly, the panel assembly comprising:

an isogrid panel wherein comprising a base plate, and ribs extending from the base plate, wherein triangular recesses are formed between the base plate and the ribs;

an inner heat shield coupled to a first side of the isogrid panel, wherein an air plenum is disposed between the isogrid panel and the inner heat shield, and wherein the inner heat shield faces an engine core compartment;

a plurality of standoff bars that space the isogrid panel from the inner heat shield;

an outer skin coupled to a second side of the isogrid panel, wherein the second side is opposite from the first side, wherein the outer skin comprises a plurality of perforations, and wherein the outer skin faces a fan duct;

one or more air inlet vent holes formed through the isogrid panel and the outer skin, wherein the one or more air inlet vent holes fluidly couple to the air plenum; and one or more air outlet vent holes formed through the isogrid panel and the outer skin, wherein the one or more air outlet vent holes fluidly couple to the air plenum.

Clause 20. The engine of Clause 19, wherein the one or more air inlet vent holes and the one or more air outlet vent holes do not extend into the inner heat shield, wherein the one or more air inlet vent holes are disposed at an inlet end of the panel assembly, and wherein the one or more air outlet vent holes are disposed at an outlet end of the panel assembly.

As described herein, examples of the present disclosure provide systems and methods for cooling a thrust reverser of an engine of an aircraft.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any tools or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A panel assembly forming an inner wall of a thrust reverser of an engine of an aircraft, wherein the thrust reverser is disposed within an aft section of a nacelle, wherein the thrust reverser comprises a first portion spaced apart from a second portion, wherein the first portion mirrors the second portion, wherein a passage extends between the first portion and the second portion, and wherein at least a portion of an engine core extends into the passage, the panel assembly comprising:

an isogrid panel which comprises a base plate, and ribs extending from the base plate, wherein recesses are formed between the base plate and the ribs;

an inner heat shield coupled to a first side of the isogrid panel, wherein an air plenum is disposed between the base plate of the isogrid panel and the inner heat shield;

an outer skin coupled to a second side of the isogrid panel, wherein the second side is opposite from the first side;

one or more air inlet vent holes formed through the isogrid panel and the outer skin, wherein the one or more air inlet vent holes fluidly couple to the air plenum; and one or more air outlet vent holes formed through the isogrid panel and the outer skin, wherein the one or more air outlet vent holes fluidly couple to the air plenum.

2. The panel assembly of claim 1, wherein the outer skin faces a fan duct, and wherein the inner heat shield faces an engine core compartment.

3. The panel assembly of claim 1, wherein the recesses are triangular.

4. The panel assembly of claim 1, wherein the isogrid panel is formed from aluminum.

5. The panel assembly of claim 1, wherein the outer skin comprises a plurality of perforations.

6. The panel assembly of claim 1, further comprising a plurality of standoff bars that space the isogrid panel from the inner heat shield.

7. The panel assembly of claim 6, wherein the standoff bars are formed of a low conductivity material, wherein the standoff bars are longitudinally continuous between the inner heat shield and a base plate of the isogrid panel.

8. The panel assembly of claim 1, wherein the one or more air inlet vent holes and the one or more air outlet vent holes do not extend into the inner heat shield.

9. The panel assembly of claim 1, wherein the one or more air inlet vent holes are disposed at an inlet end of the panel assembly, and wherein the one or more air outlet vent holes are disposed at an outlet end of the panel assembly.

10. The panel assembly of claim 1, wherein the panel assembly comprises:

a lower flange;

an outwardly bowed barrel segment, wherein the lower flange is connected to the outwardly bowed barrel segment; and an upper flange, wherein the outwardly bowed barrel segment is connected to the upper flange.

11. A method for forming a panel assembly which forms an inner wall of a thrust reverser of an engine of an aircraft, wherein the thrust reverser is disposed within an aft section of a nacelle, wherein the thrust reverser comprises a first portion spaced apart from a second portion, wherein the first portion mirrors the second portion, wherein a passage extends between the first portion and the second portion, and wherein at least a portion of an engine core extends into the passage, the method comprising:

coupling an inner heat shield to a first side of an isogrid panel which comprises a base plate, and ribs extending from the base plate, wherein recesses are formed between the base plate and the ribs, wherein an air plenum is disposed between the base plate of the isogrid panel and the inner heat shield;

coupling an outer skin coupled to a second side of the isogrid panel, wherein the second side is opposite from the first side;

forming one or more air inlet vent holes through the isogrid panel and the outer skin;

forming one or more air outlet vent holes formed through the isogrid panel and the outer skin, wherein the one or more air outlet vent holes fluidly couple to the air plenum; and forming, with the panel assembly, the inner wall of the thrust reverser of the engine of the aircraft.

12. The method of claim 11, wherein the outer skin faces a fan duct, and wherein the inner heat shield faces an engine core compartment.

13. The method of claim 11, wherein the recesses are triangular.

14. The method of claim 11, wherein the isogrid panel is formed from aluminum.

15. The method of claim 11, wherein the outer skin comprises a plurality of perforations.

16. The method of claim 11, further comprising spacing, by a plurality of standoff bars, the isogrid panel from the inner heat shield.

17. The method of claim 11, wherein the one or more air inlet vent holes and the one or more air outlet vent holes do not extend into the inner heat shield.

18. The method of claim 11, wherein the one or more air inlet vent holes are disposed at an inlet end of the panel assembly, and wherein the one or more air outlet vent holes are disposed at an outlet end of the panel assembly.

19. An engine for an aircraft, the engine comprising:

a thrust reverser having an inner wall, wherein the inner wall is formed by a panel assembly, wherein the thrust reverser is disposed within an aft section of a nacelle, wherein the thrust reverser comprises a first portion spaced apart from a second portion, wherein the first portion mirrors the second portion, wherein a passage extends between the first portion and the second portion, and wherein at least a portion of an engine core extends into the passage, the panel assembly comprising:

an isogrid panel comprising a base plate, and ribs extending from the base plate, wherein triangular recesses are formed between the base plate and the ribs;

an inner heat shield coupled to a first side of the isogrid panel, wherein an air plenum is disposed between the base plate of the isogrid panel and the inner heat shield, and wherein the inner heat shield faces an engine core compartment;

a plurality of standoff bars that space the isogrid panel from the inner heat shield;

an outer skin coupled to a second side of the isogrid panel, wherein the second side is opposite from the first side, wherein the outer skin comprises a plurality of perforations, and wherein the outer skin faces a fan duct;

one or more air inlet vent holes formed through the isogrid panel and the outer skin, wherein the one or more air inlet vent holes fluidly couple to the air plenum; and one or more air outlet vent holes formed through the isogrid panel and the outer skin, wherein the one or more air outlet vent holes fluidly couple to the air plenum.

20. The engine of claim 19, wherein the each of the one or more air inlet vent holes and the one or more air outlet vent holes are formed by a metal tube, wherein the one or more air inlet vent holes and the one or more air outlet vent holes do not extend into the inner heat shield, wherein the one or more air inlet vent holes are disposed at an inlet end of the panel assembly, and wherein the one or more air outlet vent holes are disposed at an outlet end of the panel assembly.

* * * * *